No. 664,035. Patented Dec. 18, 1900.
T. BURRELL.
TIRE FOR CYCLES OR OTHER ROAD VEHICLES.
(Application filed July 20, 1900.)
(No Model.) 2 Sheets—Sheet 1.
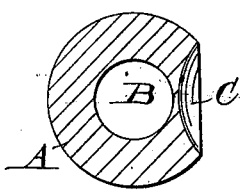
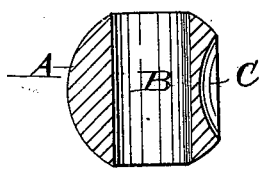
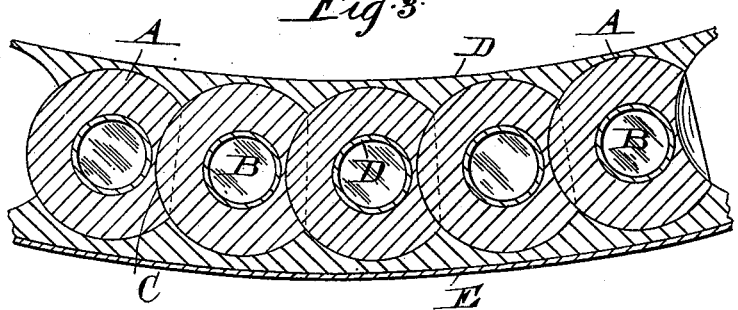
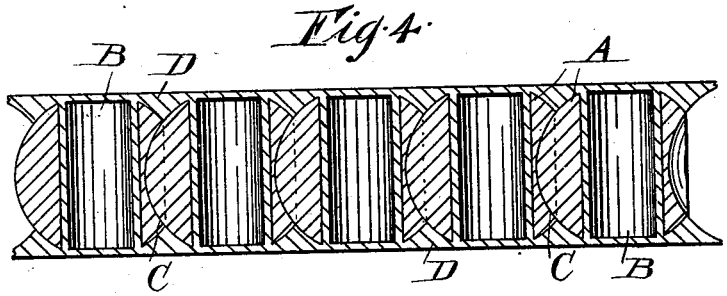
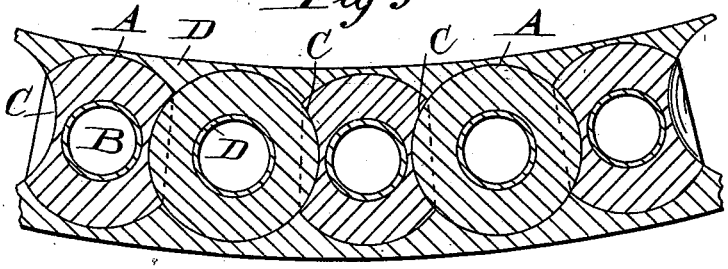
Witnesses
Inventor
Thomas Burrell
by James L. Norris
atty No. 664,035. Patented Dec. 18, 1900.
T. BURRELL.
TIRE FOR CYCLES OR OTHER ROAD VEHICLES.
(Application filed July 20, 1900.)
(No Model.) 2 Sheets—Sheet 2.
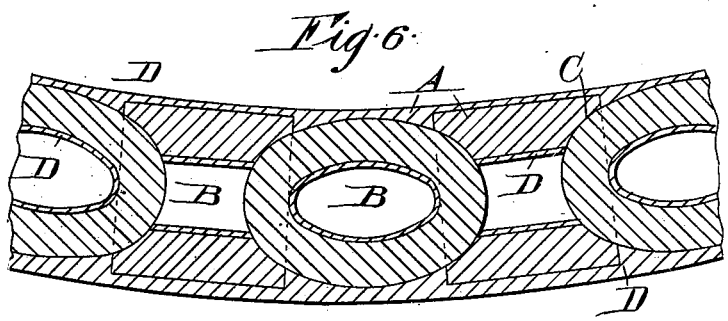
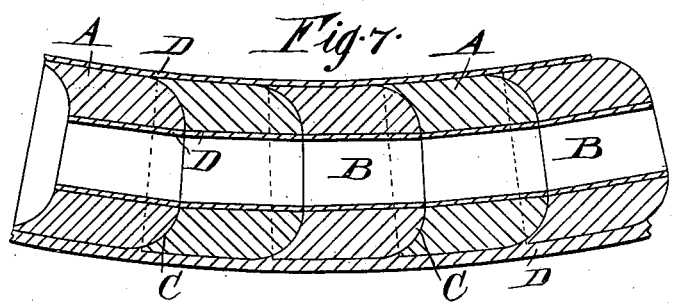
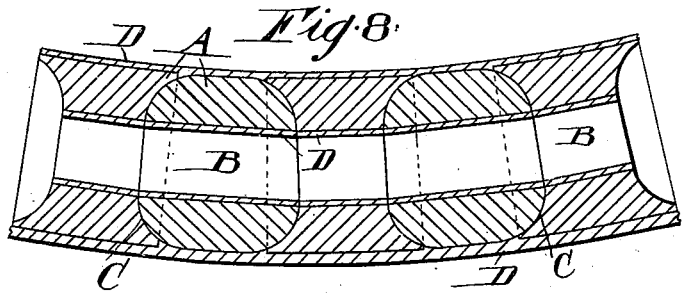
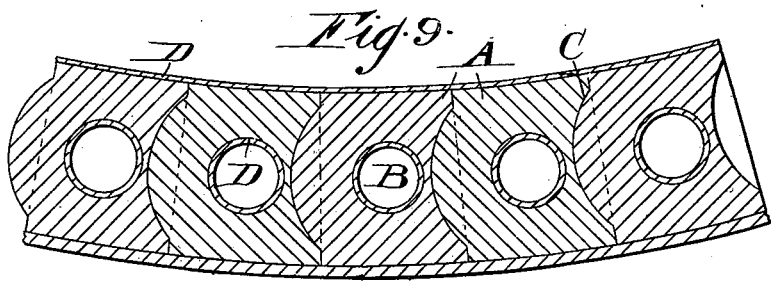

UNITED STATES PATENT OFFICE.

THOMAS BURRELL, OF NORTH MELBOURNE, VICTORIA.

TIRE FOR CYCLES OR OTHER ROAD-VEHICLES.

SPECIFICATION forming part of Letters Patent No. 664,035, dated December 18, 1900.

Application filed July 20, 1900. Serial No. 24,325. (No model.)

*To all whom it may concern:*

Be it known that I, THOMAS BURRELL, stone-mason, a subject of the Queen of Great Britain, residing at No. 193 Abbotsford street, North Melbourne, in the British Colony of Victoria, have invented an Improved Tire for Cycles or other Road-Vehicles, of which the following is a specification.

This invention has been devised in order to provide a tire which will supersede the pneumatic tires at present in use on cycles and other road-vehicles and which will not possess the defects inherent in such tires. Foremost among these defects the annoyances caused by puncture stand first, while the necessity for blowing up or inflating the tires is also a constant source of annoyance to cyclists and other users of vehicles fitted with pneumatic tires. It has been proposed to use various modifications of cushion-tire; but these have not in practice been found to be satisfactory, owing to various causes, one being their expense and another their excessive weight. Now this invention has been devised in order to remedy these various defects by providing a tire which, while being comparatively inexpensive, will be light and sufficiently resilient to make the vehicle run noiselessly and smoothly over ordinary roads and which will also be durable and unaffected by puncture.

In order that this invention may be clearly understood, it will be described with reference to the accompanying drawings, in which—

Figure 1 is a vertical and Fig. 2 a horizontal section of a spherical or spheroidal block of cork or other equivalent resilient compressible material used in the construction of this improved tire, while Figs. 3 and 4 are similar views illustrating a series of said blocks in position and coated with vulcanized rubber or other material. Figs. 5 to 9 are various views illustrating modifications of the tire.

The same letters of reference are used to indicate the same or corresponding parts throughout the figures.

In the arrangement illustrated in Figs. 1 to 4, A A represent a number of spherical or spheroidal blocks of cork or other equivalent resilient compressible material, each having a comparatively large hole B formed or bored transversely through it and having a cup-shaped or concave recess C on one side corresponding to the convex contour of the adjoining block. A number of these pieces or blocks are placed side by side, as illustrated in Figs. 3 and 4, with the periphery of each block resting within or bearing against the cup-shaped or concave recess C in the side of the next one to it, said recesses serving to assist in maintaining the blocks in their proper relative positions, and yet allowing a certain amount of play between the various constituent elements of the tire. The ring of blocks thus formed is suitably enveloped or cased, preferably, in rubber D, and the interior of the holes B are also coated, thereby excluding dust, dirt, and moisture and at at the same time serving to retain the various blocks in their proper position in a neat and regular ring. The rubber is preferably vulcanized, and owing to the thickness of said material in the triangular spaces left between the adjacent blocks there is a certain amount of "give" longitudinally within the tire, which enables it to be sprung into position around the rims of bicycle or other wheels of road-vehicles.

Prior to being coated with rubber the cork blocks may, if preferred, be coated with a vegetable or animal oil or other greasy substance which will act as a preservative and prevent the cork becoming perished or hard.

If preferred, the tire constructed as above described may be inclosed within an outer cover or casing, which can be attached to the rim of the wheel in any convenient manner. For instance, what are known as "Dunlop" covers can be employed, while a suitable kind of rim is that known as the "Westwood" rim, or instead of using a detachable cover, as above mentioned, the periphery of the tire might be covered with a wearing-strip of any suitable material, as illustrated at E.

The holes B through the blocks of cork in the arrangement above described are preferably arranged to extend transversely through the tire, and in any case must not be radial. They can, as hereinafter described, be arranged longitudinally, if desired.

The construction illustrated in Figs. 1 to 4 can be modified, as illustrated in Fig. 5, the alternate blocks of cork being spherical or spheroidal, without any cup-shaped or concave recesses C, while the intermediate blocks are formed with such recesses C on each side, the recessed and non-recessed blocks being arranged alternately, as clearly illustrated in said figure. Again, as illustrated in Fig. 6, the holes through some of the blocks may be transverse and through others longitudinal of the tire, and said blocks may be alternately spheroidal and cylindrical, as shown in said figure, or, if preferred, as illustrated in Fig. 7, they may all be cylindrical and have longitudinal or axial holes through them, the ends of the blocks being convex and cup-shaped or concave alternately, or, as illustrated in Fig. 8, the alternate cylindrical blocks may be made with both ends convex or concave. As a further modification the ends of the blocks may be shaped as illustrated in Fig. 9, with a slight convex projection fitting into a correspondingly shaped and sized cup-shaped or concave recess in the adjacent end of the next block.

Having now particularly described and ascertained the nature of my said invention and in what manner the same is to be performed, I declare that what I claim is—

1. A tire for cycles and other road-vehicles consisting of blocks of cork or other equivalent resilient compressible material having holes therethrough and having their adjacent sides formed so that they will interlock or fit together to form a ring which is enveloped in rubber substantially as and for the purposes herein described.

2. In a tire a number of spherical or spheroidal blocks of cork or other equivalent resilient compressible material each having a comparatively large hole bored transversely therethrough and each formed with a cup-shaped or concave recess on one side (as C) corresponding to the contour of the adjoining block substantially as and for the purposes herein described.

THOMAS BURRELL.

Witnesses:
WALTER SMYTHE BAYSTON,
EDWIN WILSON.